United States Patent
Perry

(10) Patent No.: US 7,171,996 B2
(45) Date of Patent: Feb. 6, 2007

(54) MEASURING AND DISPENSING DEVICE FOR ATTACHMENT TO THE CAP ON A BOTTLE

(75) Inventor: Timothy Perry, London (GB)

(73) Assignee: Reckitt Benckiser Healthcare (UK) Limited, Slough (GB)

( * ) Notice: Subject to any disclaimer, the term of this patent is extended or adjusted under 35 U.S.C. 154(b) by 0 days.

(21) Appl. No.: 10/531,992

(22) PCT Filed: Dec. 5, 2003

(86) PCT No.: PCT/GB03/05318

§ 371 (c)(1),
(2), (4) Date: Apr. 20, 2005

(87) PCT Pub. No.: WO2004/053433

PCT Pub. Date: Jun. 24, 2004

(65) Prior Publication Data

US 2006/0054240 A1    Mar. 16, 2006

(30) Foreign Application Priority Data

Dec. 6, 2002    (GB) ................................ 0228480.0

(51) Int. Cl.
B65B 1/04    (2006.01)
(52) U.S. Cl. ..................................................... 141/381
(58) Field of Classification Search ......... 141/379–381
See application file for complete search history.

(56) References Cited

U.S. PATENT DOCUMENTS

| 202,268 | A | | 4/1878 | Keller |
| 2,019,071 | A | * | 10/1935 | Carr ........................... 604/295 |
| 2,559,168 | A | | 7/1951 | Numbers |
| 4,150,761 | A | | 4/1979 | Collins |
| 4,416,381 | A | * | 11/1983 | Swartwout .................. 215/228 |
| 4,723,690 | A | | 2/1988 | von Hofe |
| 5,806,723 | A | * | 9/1998 | DuBose ...................... 222/211 |

FOREIGN PATENT DOCUMENTS

| DE | 567 569 C | 9/1933 |
| DE | 83 33 126 U | 2/1984 |
| EP | 0 300 585 A2 | 1/1989 |
| EP | 0 300 585 A3 | 1/1989 |
| EP | 0 998 895 A1 | 5/2000 |
| ES | 276 900 U | 6/1984 |
| GB | 2 141 095 A | 12/1984 |
| GB | 2 183 217 A | 6/1987 |
| JP | 2001-192038 A | 7/2001 |

* cited by examiner

Primary Examiner—Steven O. Douglas
(74) Attorney, Agent, or Firm—Rothwell, Figg, Ernst & Manbeck

(57) ABSTRACT

A measuring and dispensing device (2) for attachment to the cap (14) of a bottle (16) of liquid medicine comprises on one of its sides a socket formation (6), by means of which it may be releasably attached to the cap, and on another side a concave formation (4) for receiving liquid medicine.

8 Claims, 3 Drawing Sheets

MEASURING AND DISPENSING DEVICE FOR ATTACHMENT TO THE CAP ON A BOTTLE

CROSS REFERENCE TO RELATED APPLICATION

This application is a 35 USC § 371 National Phase Entry Application from PCT/GB2003/005318, filed Dec. 5, 2003, and designating the United States.

The present invention relates to a device for measuring and dispensing liquid medicine.

One current device for measuring and dispensing liquid medicine is a graduated medicine spoon. This is cheap and compact but many users find it prone to spillage, and inconvenient to use.

A second measuring and dispensing device is a graduated cup. This is typically a substantially straight-sided cup with a transverse bottom wall. This is less prone to mess than the spoon but is prone to difficulties, nevertheless. The straight-sided design means that it can be difficult to accurately assess the level of liquid against the graduations. Furthermore, there may be a considerable loss of viscous liquid medicines, retained on the inside surfaces of the cup. With the spoon, of course, the user typically uses the mouth parts to remove all the medicine. With the cup the user only receives the medicine which flows under gravity into the mouth.

In accordance with the present invention there is provided a measuring and dispensing device for attachment to the cap on a bottle of liquid medicine, the device comprising on one of its sides a socket formation by means of which it may be releasably attached to the cap, and on another side a concave formation for receiving liquid medicine.

Preferably the socket formation and the concave formation face in opposite directions. In use, with the bottle still on its base, the socket formation faces downwards and the concave formation faces upwards, with the device being carried at the top of the bottle.

Preferably the concave formation and the socket formation are the only recess formations in the device.

The device could be positively secured to the cap, for example by means of a screw connection, between the internal surface of the socket and the external surface of the cap. Preferably, however, there is no such positive securement. Preferably there is only a drop-on connection between the socket and the bottle cap. Preferably removal of the device from the bottle merely requires the device to be lifted from the bottle, so that the socket is raised from the cap.

Preferably the cap of the bottle fits reasonably closely within the socket, sufficiently closely that the device cannot easily be knocked from the cap of the bottle but not so closely that the measuring and dispensing device can be used to assist the removal of the cap. If this happened it would compromise any child-resistant property of the cap of the bottle.

However, embodiments in which the measuring and dispensing device is secured to a cap of the bottle in such a way that they can be turned together are not excluded. Such embodiments may be employed when it is desired to provide some assistance to overcome any child-resistance features, with the measuring and dispensing device providing a mechanical advantage, compared with the cap alone. Such assistance may be required by elderly persons, for example.

Preferably the measuring and dispensing device, when removed from the bottle, may be stood on a horizontal surface with the concave formation facing upwards, so that liquid medicine can be poured into it. One way in which this can be achieved is by the termination of the free end of the socket formation in a plain edge. Preferably such an edge is circular and all in one plane, substantially perpendicular to the axis of the socket formation. Another embodiment has a plurality of feet all terminating in a common plane. For stability there are preferably at least three feet, preferably evenly spaced about the free end of the socket formation. In such an embodiment there is preferably an even number of feet. By such means the user can hold the device in a very stable manner, with finger and thumb applied across a diameter of the socket formation, from one foot to another. When there is an odd number of feet the device cannot be held so securely, from foot to foot across a diameter.

Preferably the measuring and dispensing device is of a plastics material, more preferably a thermoplastics material. Especially suitable are polyolefins, for example polyethylene or, most preferably, polypropylene.

Preferably the measuring and dispensing device is manufactured by a moulding process, for example injection moulding.

Preferably the internal surface of the concave formation is graduated, most preferably with 2.5 ml and/or 5 ml graduations. Alternatively or additionally it may have a 10 ml graduation and/or a 15 ml graduation. Preferably the capacity of the concave formation is somewhat larger than the volume denoted by the highest graduation, so that, for a corresponding dose, it does not have to be filled to the top. Preferably its capacity is at least 8 ml. Preferably, its capacity does not exceed 25 ml, and preferably does not exceed 15 ml. Most preferably it does not exceed 12 ml.

Suitably the concave formation is circular, or, preferably, oval in plan view.

In certain embodiments the concave formation is without discontinuities on its internal surface. For example it contains no bumps, ridges or grooves marking the transition between one region of the surface and another, but preferably curves smoothly throughout its internal surface. In such embodiments any graduation is by means of in-the-plane surface marking, for example achieved by co-injection moulding.

In other embodiments any graduation is by means of one or more surface discontinuities, preferably one or more ridges. When such is provided the concave formation is otherwise free of discontinuities on its internal surface.

Preferably the internal surface of the concave formation has a surface finish which does not tend to retain liquid medicine. For example the surface may by its chemical nature repel the liquid medicine. Alternatively, it may have a physical finish which has a similar effect. For example it may have a surface which is microscopically smooth. The surface may have a shiny finish, preferably achieved by the method of primary manufacture, for example by employing a highly polished mould.

The concave formation may terminate, at its rim, in a slightly inwardly displaced region, with a view to preventing some incidents of spillage of liquid medicine, from the concave formation.

The upper face within the socket formation could be flat but is preferably concave, uneven or, especially convex, so that the top of the cap of the bottle and the upper surface of the socket formation do not make substantial face-to-face contact. Preferably the upper face of the socket formation follows the shape of the concave formation. Preferably there is a curved wall therebetween, having the respective concave and convex surfaces.

Preferably the upper face within the socket formation has one or more projections, preferably including at least a central projection when the upper face is concave. This means that there is only point contact between the upper face with the socket formation and the top of the cap. We have found that this measure facilitates the removal of the dispensing and measuring device from the bottle cap.

In accordance with a second aspect of the present invention there is provided a bottle of liquid medicine, the cap of the bottle having fitted to it a measuring and dispensing device of the first aspect, as defined above.

In accordance with a third aspect of the present invention there is provided a method of dispensing liquid medicine from the bottle of the second aspect, the method including:

removing the measuring and dispensing device from the cap of the bottle;

removing the cap; and delivering the liquid medicine from the bottle into the concave formation of the measuring and dispensing device to the required amount.

The invention will now be further described, by way of example, with reference to the accompanying drawings, in which.

Figure 1:
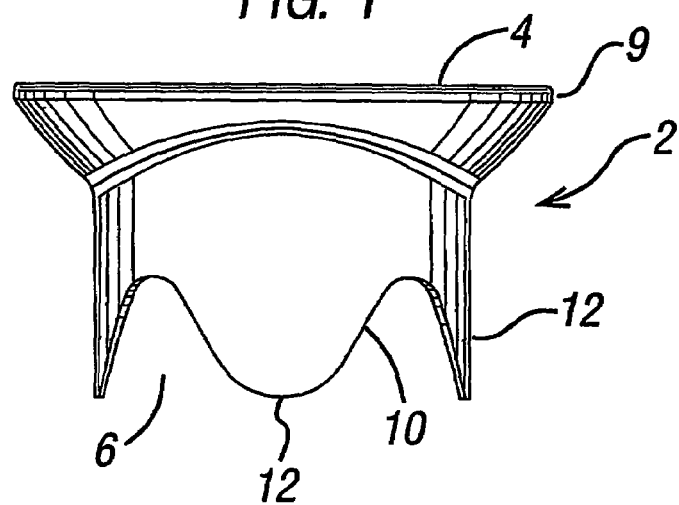
FIG. 1 shows a first embodiment of measuring and dispensing device of the present invention in side elevation.
Figure 2:
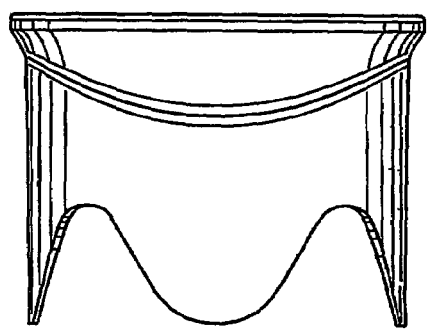
FIG. 2 shows the same device in front elevation.
Figure 3:
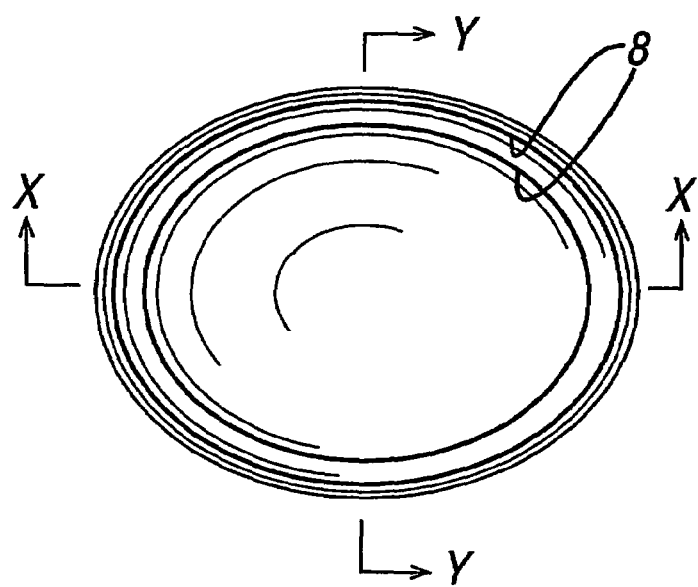
FIG. 3 shows the same device in plan view.
Figure 4:
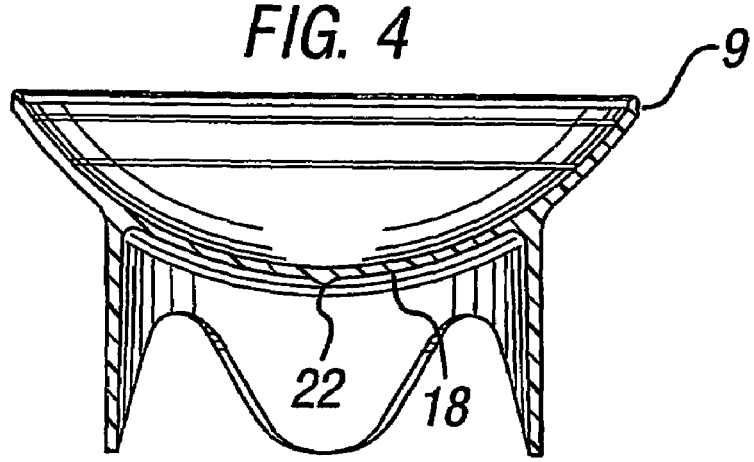
FIG. 4 is a sectional view of the device along line X—X in FIG. 3.
Figure 5:
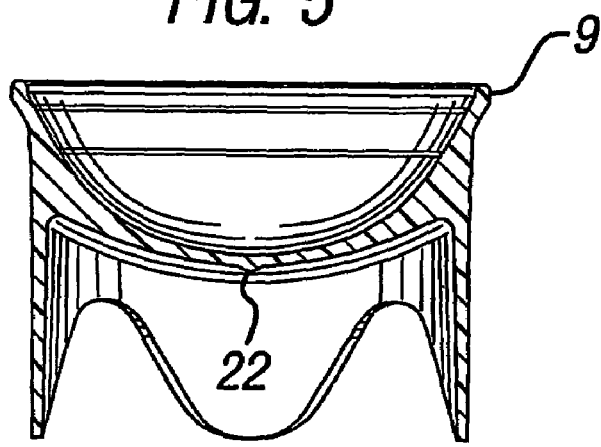
FIG. 5 is a sectional view of the same device along line Y—Y in FIG. 3.

The measuring and dispensing device 2 has on one side a concave formation 4 and has on its other side a socket formation 6. The socket formation 6 is generally cylindrical. The concave formation 4 is smoothly concave, without any surface discontinuities. It is in the form of a dish or bowl, of volume 12 ml. In plan view it is of oval shape, as can be seen in FIG. 3.

The measuring and dispensing device is made by injection moulding of polypropylene. The surface finish is very smooth and shiny and this is achieved by virtue of the material selected and the very smooth finish of the cavity of the mould employed in the manufacture.

On the internal surface of the concave formation there are in-the-plane graduation lines 8 and numbers indicative of 2.5 ml and 5 ml liquid volume levels. These are formed by co-injection during the moulding process.

The concave formation 4 is moulded at its rim with a inflect 9, as an anti-spill measure.

The cylindrical wall of the socket formation terminates at its free end in a deep wavy edge 10, this edge defining four identical feet 12 with equal spaces between them.

The socket formation 6 is of size to fit snugly over the cylindrical cap 14 which closes the neck of medicine bottle 16, so that there is little risk of the device falling from, and little risk of it being knocked from, the cap. Removal of the device requires a linear lifting action. However there is no grip between the socket formation 6 and the cap 14 so the latter cannot be used as an aid for the removal of the cap from the bottle. Thus, the child-resistance of the cap is not compromised.

The upper face 18 of the socket formation 6 is convex, corresponding to the shape of the concave formation; the shape of both being defined by a common, curved, wall 20. The convex upper surface 18 is formed at its peak with a small pip-like projection 22. The projection 22 marks the site of mould-filling. In the finished device it is left. When the device is pushed onto the bottle cap the contact between the concave formation and the top of the cap is, substantially, point contact, not surface-to-surface contact. This may facilitate removal of the device.

To measure and dispense medicine the device 2 is first lifted from the cap. The cap 14 is then removed from the bottle 16 in the usual way. Liquid medicine is poured from the bottle 16 into the concave formation of the device. During this operation the device may be resting on a horizontal surface, for example a worktop. Alternatively, if the user has a steady hand and prefers it, it may be held. Once the liquid has reached the required graduation line it may be placed against and poured into the mouth. Very little liquid medicine should be left in the concave formation and so nothing further is necessary. However if the user does choose to remove any remaining liquid medicine from the surface of the concave formation using mouth parts, for example the upper lip or tongue, this is easy to do.

The bottle 16 is shown with a special shape but this is not material to the present invention. A bottle of any shape could be used, and of any suitable material, for example glass or plastics.

Figure 7:
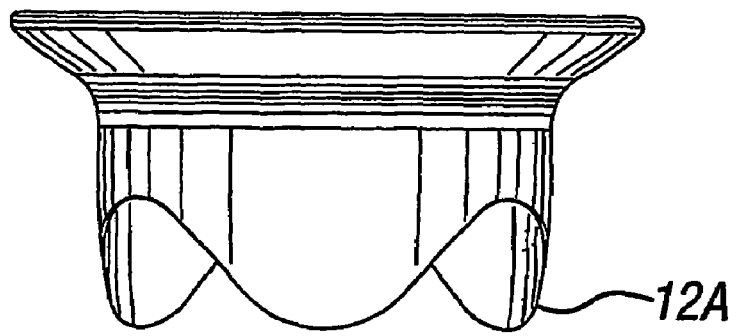
FIG. 7 shows a second embodiment of measuring and dispensing device of the invention in side view.
Figure 6:
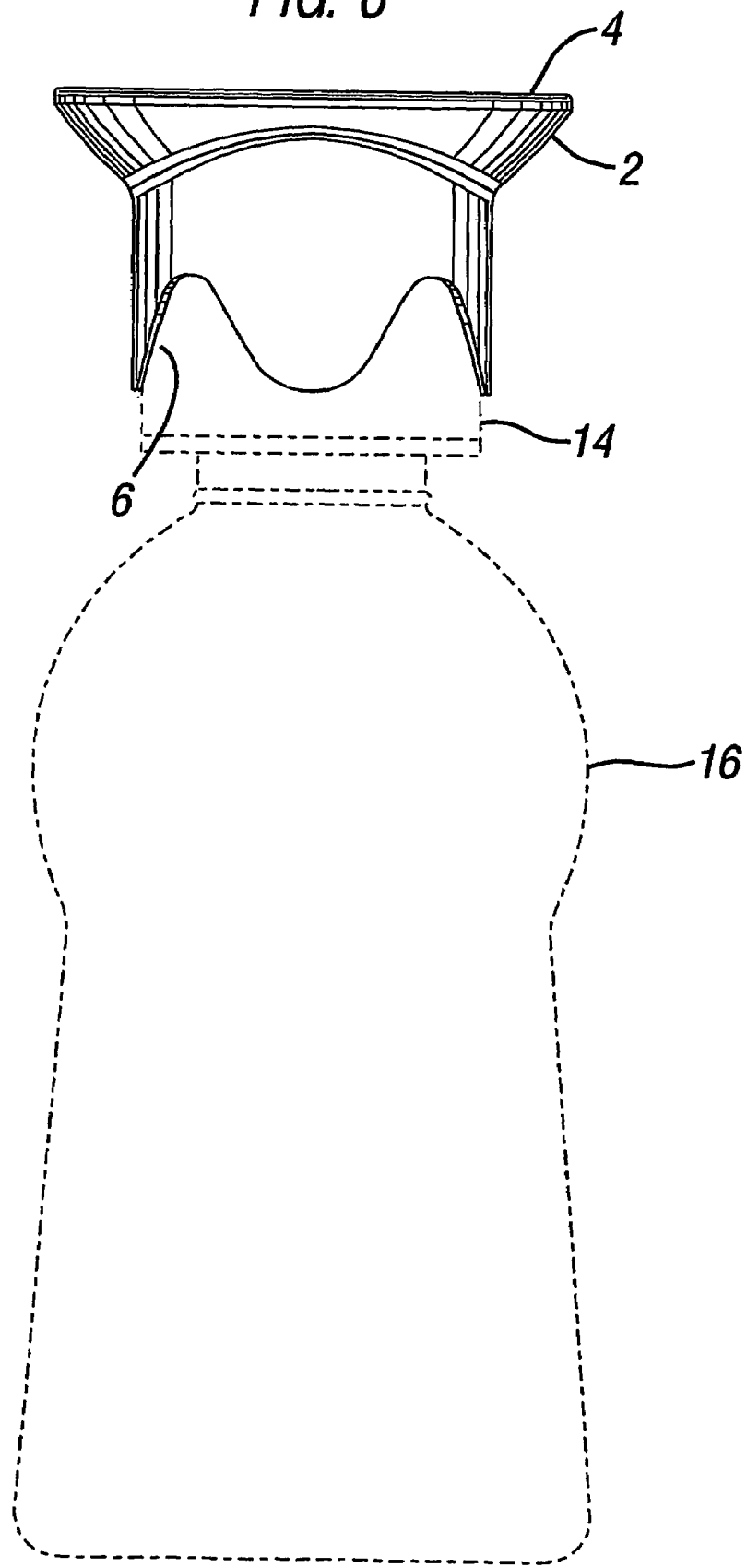
FIG. 6 shows the same device mounted on a bottle of liquid medicine, the bottle being shown in outline.

The second embodiment of measuring and dispensing shown in FIG. 7 is the same as the first embodiment except that it has three feet 12A, not four.

In a third embodiment (not shown) the socket formation ends in a plain edge which is perpendicular to the axis of the socket formation.

In a fourth embodiment (not shown) the concave formation is circular in plan view.

In a fifth embodiment (not shown) the two in-the-plane graduation lines are absent, and instead there are two moulded-in ridges.

The invention claimed is:

1. A measuring and dispensing device for attachment to the cap on a bottle of liquid medicine, the device comprising on one of its sides a socket formation by means of which it may be releasably attached to the cap, and on another side a concave formation for receiving liquid medicine disposed entirely above said socket formation, wherein the socket formation is a close but non-gripping fit on the cap.

2. A device as claimed in claim 1, wherein the socket formation and the concave formation face in opposite directions.

3. A device as claimed in claim 1, wherein the device is stable when the socket formation rests on a horizontal surface.

4. A device as claimed in claim 1, wherein the concave formation is graduated on its internal surface.

5. A device as claimed in claim 1, wherein the internal surface of the concave formation has a surface finish which does not act to retain liquid medicine.

6. A bottle of liquid medicine, having a cap onto which is fitted the socket formation of a measuring and dispensing device as claimed in claim 1.

7. A method of dispensing liquid medicine from a bottle as claimed in claim 6, the method including:

removing the measuring and dispensing device from the cap of the bottle;

removing the cap of the bottle; and delivering the liquid medicine from the bottle into concave formation of the measuring and dispensing device to the required amount.

8. A device as claimed in claim 1, wherein the axial center of the socket formation contains a projection which, when the device is in use, makes contact with the cap.

* * * * *